June 22, 1965
C. M. BROCK ETAL
3,190,930
PREPARATION OF 1,1-DIFLUOROETHANE
Filed May 22, 1961
2 Sheets-Sheet 1
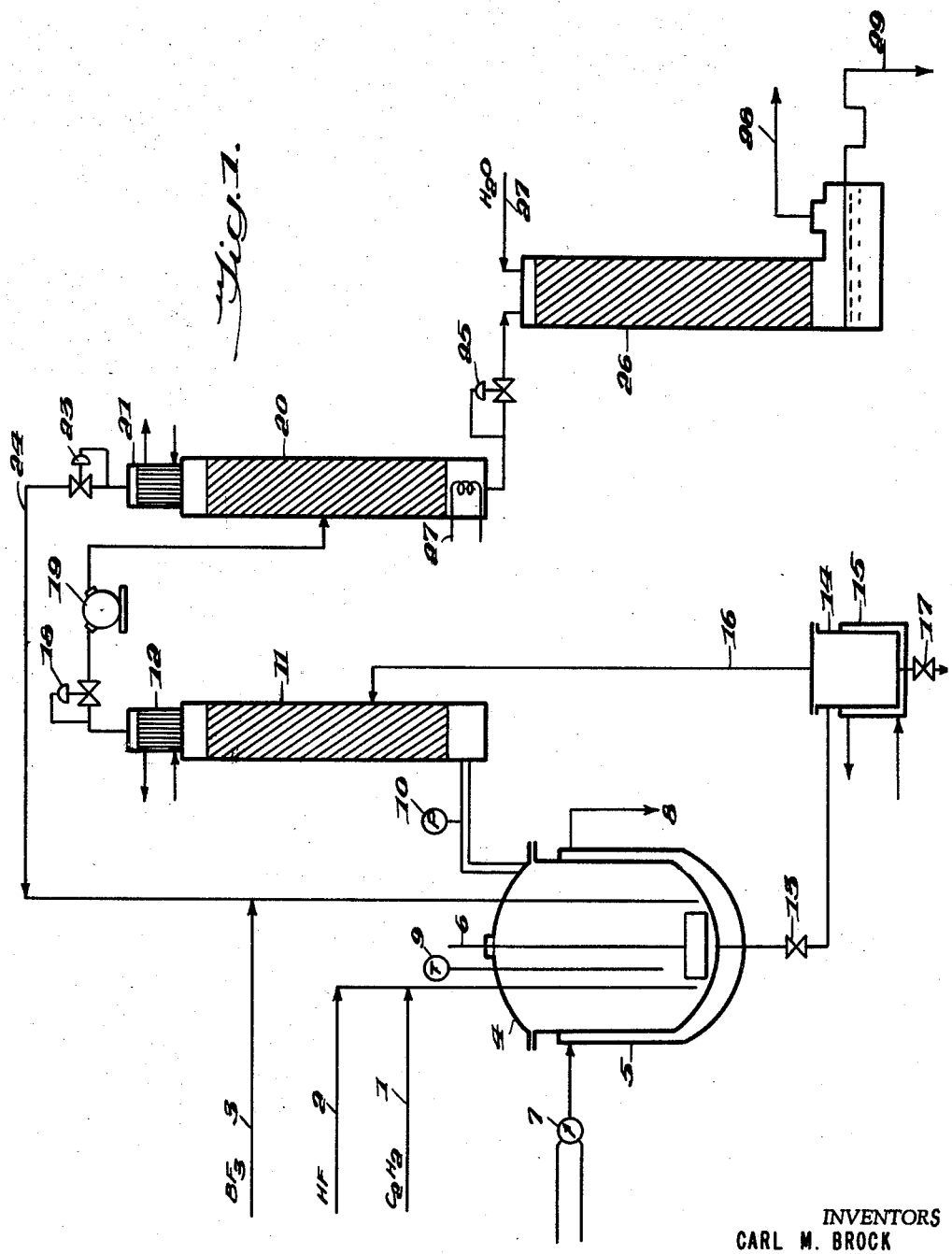
INVENTORS
CARL M. BROCK
ROBERT F. DREES
JOHN F. SMITH
BY *Robert C. Kline*
ATTORNEY June 22, 1965
C. M. BROCK ETAL
3,190,930
PREPARATION OF 1,1-DIFLUOROETHANE
Filed May 22, 1961
2 Sheets-Sheet 2
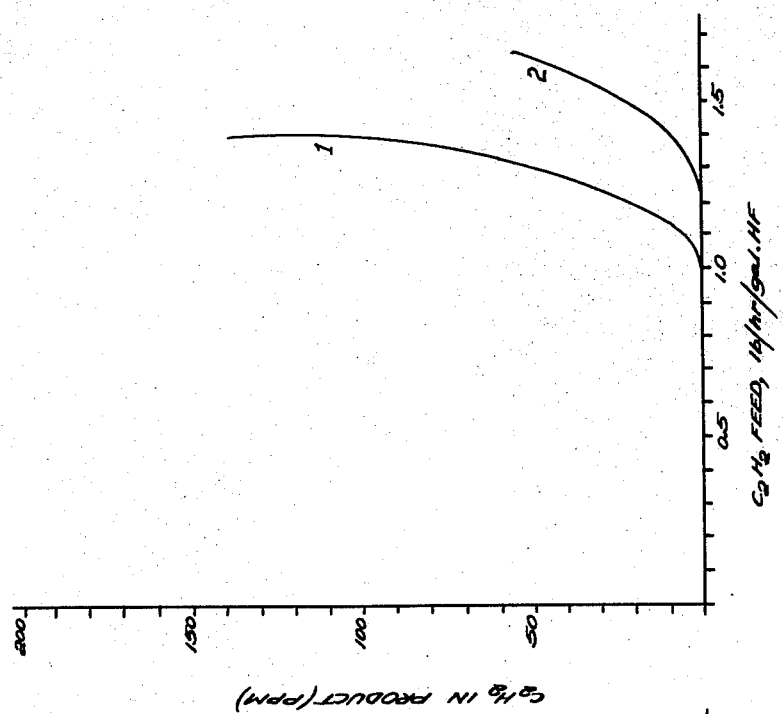
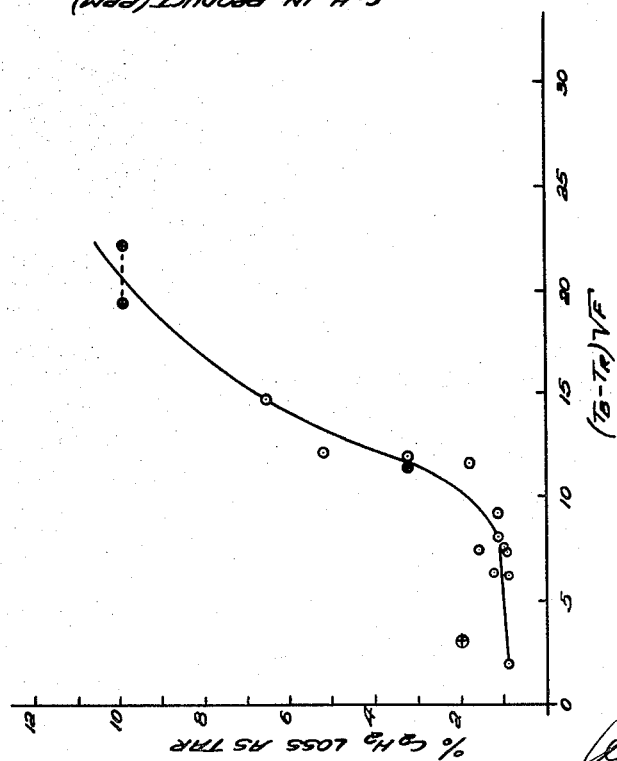
INVENTORS
CARL M. BROCK
ROBERT F. DREES
JOHN F. SMITH
ATTORNEY

United States Patent Office 3,190,930
Patented June 22, 1965

3,190,930
PREPARATION OF 1,1-DIFLUOROETHANE
Carl M. Brock, Christiana Hundred, and Robert F. Drees and John F. Smith, Brandywine Hundred, Del., assignors to E. I. du Pont de Nemours and Company, Wilmington, Del., a corporation of Delaware
Filed May 22, 1961, Ser. No. 111,622
3 Claims. (Cl. 260—653.6)

This invention relates to an improvement in the preparation of 1,1-difluoroethane and more particularly this invention relates to the reduction of by-products of the process and reduction of contaminates from the final product.

A process for preparing 1,1-difluoroethane which comprises reacting liquid hydrogen fluoride with acetylene in the presence of boron trifluoride catalyst is described in U.S. Patent 2,425,991. In general, this process consists of reacting acetylene with liquid hydrogen fluoride containing from 1% to about 10% boron trifluoride (on weight of hydrogen fluoride) at from −20° to +50° C. and from atmospheric up to 200 p.s.i.g. pressure. This patent indicates that, in a batch process, the reaction temperature is preferably near 0° C. and that a pressure of from 5 to 150 p.s.i.g., more preferably 10 to 75 p.s.i.g., above the vapor pressure of hydrogen fluoride is preferable to keep boron trifluoride in solution.

Two things have been found to occur when operating within the wide range of conditions disclosed in the above patent. First, under most conditions, considerable amounts of tar form which decreases the yield of products and causes considerable operating difficulty such as plugged equipment. Second, acetylene in fair quantities does occur in the product. Acetylene is undesirable in the product because (1) it comes in contact with hydrogen fluoride and catalyst in the still and lines and forms tars therein which cause plugging and (2) it must eventually be removed from the product 1,1-difluoroethane at added cost and with some hazard.

The present invention is an improvement on the invention of U.S. Patent 2,425,991. Considerable amounts of tars are formed during the prior art process described above. The nature of the tar is not known with certainty. The tar is a very dark purple, almost black, solid when dry; it dissolves in acetone to give a purple solution. Analysis of a typical sample of tar is as follows: carbon 68.7%, hydrogen 6.7%, fluorine 15.2%, iodine number 113.2, moisture 0.82% and ash 0.8%. The infrared spectrum indicates the presence of hydroxyl groups, double bonds and perhaps carbonyl and ether groups. The tar probably consists of a mixture of polymers of acetylene to which fluorine and other groups are attached. The tar is soluble in hydrogen fluoride and remains in the reactor solution. Periodically, as the tar concentration builds up, the hydrogen fluoride in the reactor must be treated to remove the tars. This usually involves passing the tar containing solution through a vaporizer wherein much of the hydrogen fluoride is vaporized and reused. A considerable quantity of hydrogen fluoride cannot be removed however. Even at 120° C., the residue in the vaporizer contains about 25 weight percent hydrogen fluoride. Furthermore, if the vaporizer exceeds 90° C., the tar further polymerizes to form immobile solids which, in a commercial operation, cannot be tolerated because of the time and hazard involved in removing immobile solid from the vaporizer. The net result is that the hydrogen fluirode content of the residue is more in the order of 50% if the vaporization is carried out at sufficient pressure to recycle the hydrogen fluoride vapor to the reactor.

It is apparent then that any method which reduces tar formation reduces losses in acetylene and hydrogen fluoride. This reduction can have a considerable effect on the economics of the manufacturing process.

It is an object of this invention to provide a process for preparing 1,1-difluoroethane which minimizes the by-products formed during the reaction. A further object is to provide a process for the preparation of 1,1-difluoroethane which minimizes the amount of contaminates in the final product. Other objects will appear hereinafter.

These objects are accomplished by reacting acetylene and liquid hydrogen fluoride with boron trifluoride as a catalyst and maintaining reaction conditions so that the function $(T_B - T_R)\sqrt{F}$ is from zero to 14 where $T_B$ is the boiling point of pure hydrogen fluoride at the reaction pressure in degrees centigrade, $T_R$ is the reaction temperature measured in degrees centigrade, F is the acetylene feed rate in pounds per hour per gallon of hydrogen fluoride and $(T_B - T_R)$ being no greater than 20° C.

More particularly, the process of this invention comprises passing gaseous acetylene at a rate of up to about 1.6 pounds per gallon of liquid hydrogen fluoride per hour and gaseous boron trifluoride at a rate of from about 6 mole percent to about 30 mole percent of the acetylene fed into liquid hydrogen fluoride at a reaction pressure of from one to about eleven atmospheres and maintaining the condition so that $(T_B - T_R)\sqrt{F}$ is preferably zero to 10, $T_B$, $T_R$ and F being as above defined and $(T_B - T_R)$ is no greater than 10° C., then separating the 1,1-difluoroethane formed from hydrogen fluoride and boron trifluoride by suitable means, recovering the 1,1-difluoroethane and recycling the recovered hydrogen fluoride and boron trifluoride. The preferred conditions are a reaction pressure of 45 p.s.i.g., a $T_R$ of 54° C. to 63° C. and an acetylene feed rate of from 0.5 to about 1.1 lb./hr./gal. of hydrogen fluoride.

The pressure limitations of this invention are determined by practical considerations; less than one atmosphere requires operating under vacuum and there is no incentive for operating above eleven atmospheres, especially in view of the hazards involved, since 1,1-difluoroethane is readily condensed with ordinary cooling water at this pressure. Since $T_B$ is determined by the reaction pressure, it is necessary to know the boiling temperature $T_B$ of hydrogen fluoride at various pressures. The relationship may be determined using the equation developed by Jarry and Davis (J. Phys. Chem., 57, 600 (1953)), i.e., $$\log_{10} P_{mm} = 8.38036 - \frac{1952.55}{335.52 + T_B}$$

where $T_B$ is the temperature in degrees centigrade and $P_{mm}$ is the hydrogen fluoride vapor pressure in mm. Hg. By applying the proper transformation factors one obtains $$\log_{10} P_{p.s.i.a.} = 6.66674 - \frac{1952.55}{335.52 + T_B}$$

where $P_{p.s.i.a.}$ is the vapor pressure of hydrogen fluoride in pounds per square inch absolute. To obtain the vapor pressure in pounds per square inch gauge ($P_{p.s.i.g.}$), it is necessary to subtract 14.696 from $P_{p.s.i.a.}$.

FIGURE 1 represents a typical flow sheet of a reaction system used for the process.

FIGURE 2 represents the effect of the variable $(T_B - T_R)\sqrt{F}$ upon tar formation.

FIGURE 3 represents the contamination of acetylene in the end products against the acetylene feed rate with an approximately constant reaction temperature.

The present invention is not limited to any particular type of apparatus except that the equipment must be able to withstand the pressures developed and the corrosive effect of the reactants. In order to illustrate the invention and its operation, reference is made to FIG- URE 1 wherein is diagrammed a particular type of reaction system which has proved useful.

Acetylene and make-up boron trifluoride are fed at controlled rates through lines 1 and 3 into the autoclave type reactor 4 fitted with a water jacket 5 and an agitator 6 which stirs during the reaction. The temperature in the water jacket 5 is controlled by the mixing valve 7 using either hot water or steam and cold water; used water passes to the drain via line 8. Liquid hydrogen fluoride is added via line 2 to keep a constant liquid volume in the reactor. The temperature within the reactor is determined by the thermocouple 9 and the pressure by pressure gauge 10. All of the equipment in contact with hydrogen fluoride and boron trifluoride must be resistant to these materials and should be free of copper, silver or mercury to avoid formation of unstable acetylides. The gaseous products pass from the reactor 4 into the packed distillation column 11 and condenser 12, the latter being cooled with a suitable coolant. The necessary temperature in 12 depends on the pressure used, it should condense part 1,1-difluoroethane to remove as much hydrogen fluoride as possible from the overhead effluent. The pressure within the reactor and column is controlled by the adjustable control valve 18. Liquid hydrogen fluoride is returned to the reactor via line 10. The gaseous materials, boron trifluoride and 1,1-difluoroethane, pass from the condenser through valve 18.

When the concentration of tar in the reaction solution becomes sufficiently high, it is removed by withdrawing the solution through valve 13 into the evaporator 14 which is surrounded by the hot water or steam jacket 15. Hydrogen fluoride vaporizes and passes through line 16 into column 11 whence it is returned to the reactor 4. The tar is removed via valve 17 for disposal.

The 1,1-difluoroethane and boron trifluoride, after passing through valve 18, are compressed by compressor 19 into the packed stripping column 20 and condenser 21. The heater 22 vaporizes the boron trifluoride and part of the 1,1-difluoroethane. This column can be conveniently operated at approximately 100 p.s.i.a. and the condenser at about −42° C. but it may be operated at other pressures if desired particularly if a high reaction pressure is used. Gaseous boron trifluoride is released through pressure control valve 23 and is returned via line 24 to the reactor. Only enough boron trifluoride is admitted through line 3 to keep the desired flow of boron trifluoride in the recycle stream constant.

Liquid 1,1-difluoroethane passes through pressure control valve 25, whereon it vaporizes, into the packed scrubber 26 to remove any traces of hydrogen fluoride and boron trifluoride. Water is fed into 26 via line 27. The product separates at the bottom of the scrubber and is removed via line 28 for drying, packaging or storage. The waste water is disposed of via line 29.

The feed systems for hydrogen fluoride and acetylene (not shown in FIG. 1) depend on the quality of materials being used. Although small amounts of water can be tolerated in the hydrogen fluoride, best results are obtained if the water concentration is less than about 0.05 mole percent. Commercial hydrogen fluoride often contains some sulfur dioxide and it is better to remove the sufur dioxide before the hydrogen fluoride is used. The mixture of hydrogen fluoride and sulfur dioxide is very corrosive. Acetylene stored in cylinders is usually contaminated with some acetone and, perhaps, water vapor. These must be removed beforehand also. The methods for carrying out these purifications are well known. Boron trifluoride usually requires no pretreatment. FIG. 1 does not include such things as flow meters, thermocouples in the stills etc. whose positional placement is optional and readily apparent to those skilled in the art.

It should be understood that the operation of the stills 11 and 20, the hydrogen fluoride vaporizer 14 and the scrubber 26, while vital to the commercial manufacture of 1,1-difluoroethane, do not form an essential part of this invention. Several other methods for recovering 1,1-difluoroethane from the gaseous reaction products exist, any one of which can be used without essentially altering the present invention. For example, the two still system of FIG. 1 may be replaced by a single still wherein boron trifluoride and acetylene are removed at the top for recycle, 1,1-difluoroethane is taken as a side stream to the scrubber and hydrogen fluoride passes from the bottom back to the reactor.

The following examples will better illustrate the nature of the present invention; however, the invention is not intended to be limited to these examples. Parts are by weight unless otherwise indicated.

EXAMPLE 1

A typical run was carried out using the procedure described above under the following conditions: The reactor (4) was a 10 gallon, agitated stainless steel autoclave containing six gallons of liquid hydrogen fluoride reaction solution. The distillation column 11 and stripping column 20 were 6 inch x 10 feet steel columns packed with ½ inch steel Raschig rings. The reaction temperature was maintained at 61° C. and the reactor pressure at 45 p.s.i.g. The feed rate of acetylene was 0.55 lb. acetylene per gallon hydrogen fluoride per hour. The boron trifluoride feed (make-up and recycle) was maintained at 0.15 lb. boron trifluoride per lb. acetylene fed per hour. Condenser 12 was maintained at 25° C. and 21 at −42° C. The pressure in column 20 was maintained at 100 p.s.i.a. and reboiler at about 30° C. The scrubber 26 was a 4 inch x 10 feet Haveg column packed with 1 inch Raschig rings. The water flow through column 26 was 2 gallons per minute. The tar trap 14 was a 10 gallon steel pot maintained at 85–90° C.

1,1-difluoroethane, leaving the system via line 28, contained nil (less than 10 p.p.m.) acetylene after drying. The concentrated tar, removed from the system via valve 17 contained about 40% by weight hydrogen fluoride. After a total running time of 90 hours, the dry tar amounted to 0.89% by weight of the acetylene fed.

*Table I*

| Run No. | $C_2H_2$ feed rate, lb./hr./gal. HF | Reactor pressure, p.s.i.g. | $T_R$, °C. | $T_B$, °C. | $T_B-T_R$ | $(T_B-T_R)\sqrt{F}$ | Percent $C_2H_2$ loss to tar |
|---|---|---|---|---|---|---|---|
| 1 | 0.55 | 45 | 61 | 63.7 | 2.7 | 2.0 | 0.89 |
| 2 | 0.63 | 45 | 56 | 63.7 | 7.7 | 6.11 | 0.86 |
| 3 | 0.66 | 45 | 56 | 63.7 | 7.7 | 6.25 | 1.13 |
| 4 | 1.08 | 46 | 57 | 64.4 | 7.4 | 7.69 | 1.03 |
| 5 | 0.72 | 41 | 53 | 61.4 | 8.4 | 7.13 | 0.87 |
| 6 | 0.76 | 41 | 53 | 61.4 | 8.4 | 7.32 | 0.90 |
| 7 | 0.53 | 36 | 48 | 58 | 10.0 | 7.28 | 1.51 |
| 8 | 0.58 | 45 | 52 | 63.7 | 11.7 | 8.91 | 1.0 |
| 9 | 0.61 | 25 | 35 | 49.7 | 14.7 | 11.48 | 1.73 |
| 10 | 1.01 | 45 | 52 | 63.7 | 11.7 | 11.75 | 3.22 |
| 11 | 0.97 | 28 | 38 | 50.2 | 12.2 | 12.02 | 5.1 |
| 12 | 0.70 | 23 | 29 | 46.7 | 17.7 | 14.81 | 6.6 |

By operating under the conditions previously defined, the loss of acetylene to tar amounts to less than 6% and, at the preferred conditions, less than 1.2%. Reproduced in Table I above are 12 runs carried out in apparatus like that diagrammed in FIG. 1. Column 5, headed $T_B-T_R$ (° C.), indicates the difference between the boiling point of pure hydrogen fluoride ($T_B$) at the reaction pressure and the reaction temperature ($T_R$) used. The column $(T_B-T_R)\sqrt{F}$ indicates the important variable of the invention.

Table I indicates that when $(T_B-T_R)\sqrt{F}$ is greater than about 14, the percent tar formed becomes excessive. For economical operation, the percent tar formed should be less than about 6%. The data in Table I are shown in FIG. 2. The ⊙ indicate the points on FIG. 2 taken from Table I.

The reactor described in FIG. I of U.S. Patent 2,830,099 can be used to carry out the improved process of the present invention. This reactor consists of a vertical tube or pipe which contains liquid hydrogen fluoride; acetylene, boron trifluoride and make-up hydrogen fluoride can be added to the tube at various points, together or separately. Under any conditions however this type of reactor is not agitated except by the ascent of gas bubbles through the liquid. The mode of addition of the reactants and the rate of acetylene both have a substantial effect on the rate of tar formation, a situation not encountered in the stirred autoclave type reactor which is therefore preferred. In the tubular type reactor, $(T_B-T_R)\sqrt{F}$ has an important effect on tar formation, just as with the autoclave type reactor. The results of a series of runs in a tube type reactor are reproduced in Table II below. The auxiliary equipment was essentially as shown in FIG. 1. These reactions were under identical conditions so far as acetylene and catalyst feeds are concerned. Both acetylene and boron trifluoride were added near the bottom of the tube via separate inlets. The effect of temperature on tar formation is apparent from Table II. The last entry in this table shows the effect of increasing the acetylene feed rate in this type reactor, from 0.32 lb./gal./hr. to 0.64 lb./hr./gal.

*Table II*

| Run No. | Reactor temp., ° C. | $T_B-T_R$ | $(T_B-T_R)\sqrt{F}$ | Percent $C_2H_2$ loss to tar |
|---|---|---|---|---|
| 1 | 15 | 5 | 2.83 | 2.0 |
| 2 | 0 | 20 | 11.33 | 3.2 |
| 3 | −7 to 0 | 35–40 | 19.82–22.65 | 10.0 |
| 4 | 0 | 20 | 16.00 | 4.5 |

The ⊕ on FIG. 2 represents the points of Table II.

The procedures which have been disclosed in the prior art state that the reaction of acetylene with hydrogen fluoride should be carried out under a pressure of from 5 to 150 p.s.i. and preferably at from 10 to 75 p.s.i. in excess of the hydrogen fluoride vapor pressure at the reaction temperature to increase boron trifluoride solubility, resulting in more complete conversion. It is also indicated that while the reaction will take place over a wide range of temperatures, the preferred temperature is from zero to 30° C. The preferred conditions of the present invention are 45 p.s.i.g. and a temperature of from about 54 to about 63° C. Under these conditions, the pressure in excess of the vapor pressure of hydrogen fluoride varies from zero to about 14 p.s.i. While the preferred temperature range which is no greater than 10° C. in the present invention corresponds to a pressure range, it does not correspond to the same pressure range through the range of usable temperatures. For example, from 10 to 20° C., the pressure varies 5 p.s.i., from 50 to 60°—14 p.s.i., from 70 to 80°—22 p.s.i. It is not the pressure however which is important but the combination of temperature and acetylene feed rate used.

Contrary to the prior art procedures, it is not necessary to maintain excess pressure to maintain sufficient boron trifluoride in solution to maintain a sufficient catalyst concentration. In fact, it has now been found that higher conversions of acetylene are obtained operating at from the boiling point to ten degrees below the boiling point of hydrogen fluoride at the pressure used (i.e., little or no excess pressure) than when a temperature differential $(T_B-T_R)$ greater than ten degrees is used (i.e., a larger excess pressure). This is illustrated in FIG. 3 wherein the acetylene content of the reaction product, after removing hydrogen fluoride and boron trifluoride, is plotted against acetylene feed rate. Curve 1 corresponds to a reaction temperature of 11 to 14° C. below the boiling point of hydrogen fluoride at 45 p.s.i.g. while curve 2 is for a reaction at 4° C. below the hydrogen fluoride boiling point at 45 p.s.i.g. It is readily apparent that more acetylene remains in the product, indicating less complete conversion, in curve 1 than curve 2. Thus, even though the excess pressure for curve 2 is less than curve 1, the conversion is higher.

It was noted earlier that acetylene is undesirable in the product both because it can cause tar and plugs in equipment other than the reactor particularly the first still, and because it must be removed eventually from 1,1-difluoroethane at added cost. A proportion of 1,1-difluoroethane manufactured is converted to other products such as vinyl fluoride, chloro-1,1-difluoroethane, vinylidene fluoride and others. Acetylene when heated undergoes the well known decomposition to carbon and hydrogen and is highly reactive toward other reactants leading to manufacturing difficulties in preparing these other products. For these reasons it is undesirable to have more than about 0.1% of acetylene in the product stream and is preferable to have less than 10 p.p.m. For these reasons and based on FIG. 3, the upper limit of acetylene feed has been set at about 1.6 lb./hr./gal. of hydrogen fluoride. The lower limit is determined by practical considerations; feed rates as low as 0.3 lb./hr./gal. hydrogen fluoride can be used. It is generally more desirable to operate at higher feed rates however since greater productivity of the manufacturing equipment is obtained.

The necessary boron trifluoride concentration is surprisingly low. If completely dry hydrogen fluoride is used, as little as 1–2 mole percent of boron trifluoride based on the moles of acetylene fed can be used. Completely dry hydrogen fluoride is impractical to obtain and maintain commercially however and when using commercial hydrogen fluoride, which may contain up to 0.4% water, 6 mole percent boron trifluoride is about the minimum usable limit. Boron trifluoride, of course, reacts rapidly with water in the hydrogen fluoride and is lost as complex oxyfluorides. The upper limit of boron trifluoride feed rate is determined by practical considerations, 30 mole percent on the moles of acetylene fed being a practical limit. It should be understood that the boron trifluoride feed may be composed of entirely new material or a mixture of recycle and new material but is usually the latter.

The concentration of boron trifluoride present in the liquid hydrogen fluoride reaction mixture varies as may be expected with reaction temperature. It has been found however, that catalyst concentrations of boron trifluoride between about 0.01 and 0.50 weight percent of hydrogen fluoride occurs under the conditions of the present reaction. This is a radical departure from the prior art procedures which indicate that at least 1% by weight of catalyst must be present to maintain the reaction.

As previously illustrated, it has been unexpectedly found that (a) higher acetylene conversions are obtained when the reaction pressure is equivalent to or only slightly higher than the vapor pressure of hydrogen fluoride, (b) that less tar is produced under the same conditions and (c) that higher reaction temperatures, i.e., from 50° to 70° C., produce better results both in lower tar formation and in higher acetylene conversion. Generally all chemical reactions are somewhat accelerated by increasing the temperature and such would be the expected result with tar formation also, but, as noted, the contrary is true.

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing 1,1-difluoroethane which comprises reacting acetylene and liquid hydrogen fluoride at from one to eleven atmospheres pressure with a boron trifluoride catalyst concentration of from about 0.01 to 0.50 weight percent of hydrogen fluoride, passing said acetylene through the hydrogen fluoride at a rate of from 0.3 to about 1.6 pounds of acetylene per hour per gallon of hydrogen fluoride and passing said boron trifluoride into the hydrogen fluoride at a rate of at least 6 mole percent of the said acetylene, and maintaining reaction conditions such that the function $(T_B-T_R)\sqrt{F}$ is from 0 to about 14 wherein $T_B$ is the boiling point of pure hydrogen fluoride at the reaction pressure in degrees centigrade, $T_R$ is the reaction temperature in degrees centigrade, F is the acetylene feed rate in pounds per hour per gallon of liquid hydrogen fluoride and $(T_B-T_R)$ is no greater than 20° C.

2. A process as described in claim 1 wherein said $(T_B-T_R)\sqrt{F}$ is from 0 to about 10, $(T_B-T_R)$ is no greater than 10° C. and said boron trifluoride is passed into the hydrogen fluoride at a rate of from about 6 mole percent to about 30 mole percent of acetylene.

3. A process as described in claim 2 wherein said reaction pressure is 45 p.s.i.g., said reaction temperature is 54° C. to 63° C. and said acetylene feed rate is from 0.5 to 1.1 pounds per hour per gallon of hydrogen fluoride.

References Cited by the Examiner
UNITED STATES PATENTS

| 2,425,991 | 8/47 | Burk et al. | 260—653.4 |
| 2,762,849 | 9/56 | Linn | 260—653.4 |

FOREIGN PATENTS

| 619,395 | 3/49 | Great Britain. |

LEON ZITVER, *Primary Examiner.*

MILTON STERMAN, ALPHONSO D. SULLIVAN, DANIEL D. HORWITZ, *Examiners.*